United States Patent [19]

Yasui

[11] Patent Number: 5,009,188

[45] Date of Patent: Apr. 23, 1991

[54] WATER TANK APPARATUS

[75] Inventor: Mitsuo Yasui, Yokohama, Japan

[73] Assignee: Kabushikikaisha Kaichu Kyoju Kenkyu-sho, Tokyo, Japan

[21] Appl. No.: 555,568

[22] Filed: Jul. 19, 1990

[30] Foreign Application Priority Data

Oct. 3, 1989 [JP] Japan .............................. 1-115891[U]
Oct. 12, 1989 [JP] Japan .............................. 1-118760[U]

[51] Int. Cl.$^5$ ............................................ A01K 63/00
[52] U.S. Cl. ........................................... 119/3; 4/487; 119/5
[58] Field of Search .................... 119/3, 5; 4/487, 489; 52/169.7

[56] References Cited

U.S. PATENT DOCUMENTS

| 31,657 | 3/1861 | Cutting | 119/5 |
|---|---|---|---|
| 613,528 | 11/1898 | Richmond | 119/5 |
| 729,653 | 6/1903 | Parham | 119/5 |
| 1,393,339 | 10/1921 | Banton | 119/5 |
| 1,943,417 | 1/1934 | Bringham | 119/5 |
| 3,756,197 | 9/1973 | Buss et al. | 119/3 |

Primary Examiner—Paul J. Hirsch
Attorney, Agent, or Firm—Frishauf, Holtz, Goodman & Woodward

[57] ABSTRACT

In a water tank apparatus, an attached water tank made of a transparent material and having an open upper end is attached to a peripheral wall of a lower portion of a gas-tight water tank body made of a transparent material, which is provided with a decompression unit for decompressing a space within the water tank body, so that the attached water tank communicates with the water tank body. Operation due to the decompression unit enables a water level within the water tank body is raised to a predetermined level, while a water level within the attached water tank is located below the water level within the water tank body. Thus, an enjoyer can enjoy fishes and so on within the attached water tank from the above, or can directly take an action such as feeding or the like. Further, a tunnel made of a transparent material is provided at and within a lower portion of the water tank body. The tunnel has its both ends, communicates with the outside and is provided with a communication opening which communicates with the space within the water tank body. The operation of the decompression unit enables the water level within the tunnel to be reduced less than the water level within the water tank body. Thus, it is made possible fo the enjoyer to freely walk and take a walk within the tunnel under the atmospheric pressure. The enjoyer can observe the ecology of the fishes or the like from the tunnel.

7 Claims, 4 Drawing Sheets

F I G. 1
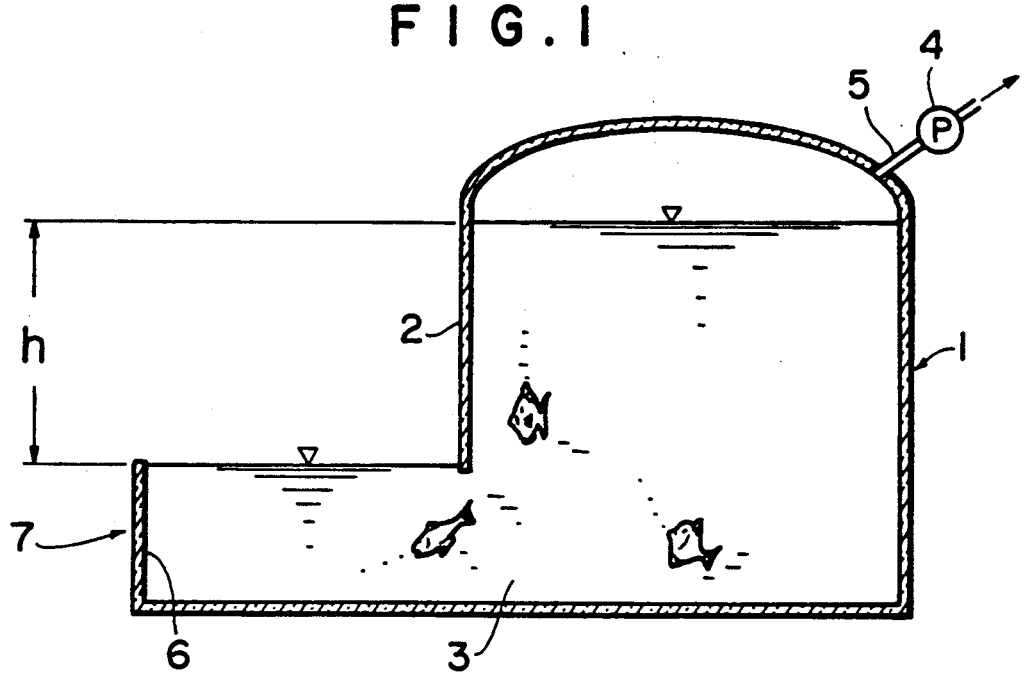
F I G. 2
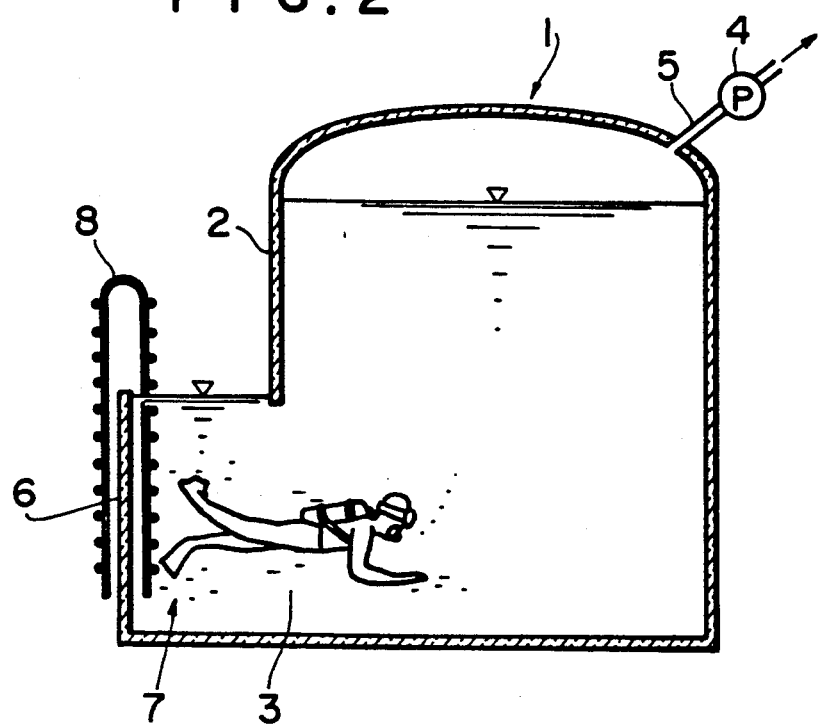

WATER TANK APPARATUS

BACKGROUND OF THE INVENTION (1) Field of the Invention

The present invention relates to a water tank apparatus set up in an aquarium or the like.

(2) Description of the Prior Art

Conventionally, an aquarium has widely been known and utilized as means for admiring or enjoying fishes and shellfishes or the like, aquatic life or the like. Fishes and so on in the aquarium are raised in a large water tank. Since an admirer or enjoyer looks up at the fishes, the enjoyer is brought to a condition or state just as he is located at a position near an underwater bottom. Thus, the enjoyer can sufficiently enjoy the fishes and so on. Further, there is also a pool-like water tank, in which an enjoyer can look into the water tank from the above.

If not only the enjoyer enjoys the ecology of fishes and so on, but also the enjoyer can take an action, for example, provisioning or feeding or the like at a location within very close to the enjoyer, enjoyment will increase double. In this respect, the provisioning or the like is made possible to a certain degree in the pool-like water tank described above.

In the general or usual cases, however, the large water tank is desirable for observation of the ecology of the fishes or the like. In the case of the large water tank, there is only enjoyment in which the enjoyer sees through the water tank made of a transparent glass material or the like. This is indirect, and leaves much to be desired. That is, if the general run of people can easily take a walk in the underwater, the above dissatisfaction will be dissolved so that enjoyment increases double.

It is considered that, as means by which the enjoyer can directly be in contact with the fishes and so on within the water tank, the enjoyer bears equipment such as, for example, a scuba or the like, and gets into the underwater. By doing so, the above-described object can be achieved. However, this means is extremely special, and is impossible for persons who are afraid of water, for persons who are poor hand at swimming, and for babies or the like. Thus, the above means is not general. In addition, problems remain in that it requires much labor to mount equipment to a person, and the expenses run up.

OBJECTS OF THE INVENTION

It is therefore an object of the invention to provide a water tank apparatus which can dissolve the above-described defects and inconvenience and in which, in spite of a water tank, fishes and shellfishes or the like, aquatic animals, and so on can be called together and can be enjoyed in ecology.

It is another object of the invention to provide a water tank apparatus in which an underwater walk can easily be made possible within a water tank so that an enjoyer can directly provide or feed fishes and shellfishes or the like, or aquatic life.

It is still another object of the invention to provide a water tank apparatus in which it is unnecessary for a person, who is a poor hand at swimming, to drive into water, and in which the person can enjoy the ecology of fishes and shellfishes or the like within a water tank just as the person is under water.

It is still another object of the invention to provide a water tank apparatus which is simple in construction, which is easy in maintenance and control, and in which it is possible to secure sufficient safety.

SUMMARY OF THE INVENTION

According to the invention, there is provided a water tank apparatus comprising a gas-tight water tank body made of a transparent material, for raising fishes and shellfishes, aquatic animals or the like, an attached water tank made of a transparent material and having an open upper end, the attached water tank being attached to a peripheral wall of a lower portion of the water tank body so that the attached water tank communicates with the water tank body, and a decompression unit provided at an upper end portion of the water tank body, for decompessing a space within the water tank body, wherein, within the water tank body brought to a decompressed state by the decompression unit, a water level within the water tank body is maintained raised to a predetermined level, wherein a water level within the attached water tank is located below the water level within the water tank body by the decompression thereof, and wherein an enjoyer can enjoy, from the above, the fishes and so on which get into the attached water tank from the water tank body, and can directly take an action such as feeding or the like.

According to the invention, there is also provided a water tank apparatus comprising a large and gas-tight water tank body made of a transparent material, for raising fishes and shellfishes or the like, aquatic animals or the like, a tunnel made of a transparent material and provided at and within a lower portion of the water tank body, the tunnel having its both open ends and communicates with the outside, a decompression unit provided at an upper end portion of the water tank body, for decompressing a space within the water tank body, a communication opening provided at a lower end of the tunnel and communicating with the space within the water tank body, and a pair of damming-up walls provided respectively at the both ends of the tunnel for preventing water from overflowing from the tunnel, wherein, within the water tank body brought to a decompressed state by the decompression unit, a water level within the water tank body is maintained raised to a predetermined level, wherein decompression of the water tank body enables a water level within the tunnel to be reduced less than the water level within the water tank body, wherein it is made possible for the enjoyer to freely walk and take a walk within the tunnel under the atmospheric pressure, wherein the enjoyer can observe the ecology of the fishes or the like within the water tank body just as the enjoyer is under water, wherein the fishes or the like within the water tank body get into the tunnel through the communication opening, and wherein an action such as feeding can directly be taken with respect to the fishes and so on.

BRIEF DESCRIPTION OF THE DRAWINGS

The above and other objects and features of the present invention will become more apparent when referred to the following description given in conjunction with the accompanying drawings in which:

FIG. 1 is a cross-sectional view of a water tank apparatus according to the invention;

FIG. 2 is a cross-sectional view showing another embodiment of the above water tank apparatus;

DETAILED DESCRIPTION OF THE PREFERRED EMBODIMENTS

Figure 3:
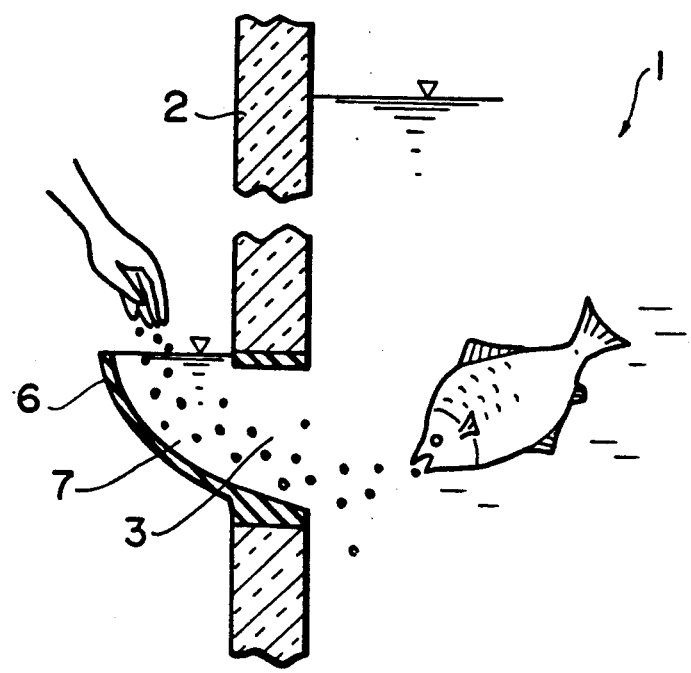
FIG. 3 is a fragmentary cross-sectional view showing still another embodiment of the above water tank apparatus.

Referring to FIG. 1, there is shown a large water tank body 1 whose at least peripheral wall 2 is made of a transparent material such as a glass material, acrylic resin or the like in a gas-tight manner. The peripheral wall 2 has its lower portion which is provided therein with a communication opening 3. Further, the peripheral wall 2 has its rear surface whose upper portion is connected to a suction passage 5. The suction passage 5 is connected to a decompression unit 4 such as a vacuum pump or the like.

In addition to the communication opening 3 in the peripheral wall 2, an attached water tank 7 is attached to and communicates with the water tank body 1. The attached water tank 7 has its upper end which is open. The attached water tank 7 has its wall portion 6 whose height is smaller than that of the peripheral wall 2 of the water tank body 1. The attached water tank 7 is made of a transparent material such as a glass material, acrylic resin or the like.

The wall portion 6 has its height which is set in accordance with the used condition. Generally, however, the height of the wall portion 6 is set to one of the order that, when a person stands up, he can look into the attached water tank 7. Moreover, the height position of the upper end of the wall portion 6 is set to a location higher than that of the upper end of the communication opening 3 which is located at the lower end of the peripheral wall 2.

A decompression value within the water tank body 1 is of the order of (1–0.1h) atmospheric pressure, if a desired distance between the water level within the water tank body 1 and the water level within the attached water tank 7 is h, and the atmospheric pressure is 1.

Furthermore, for example, in order to secure safety at interruption of the decompression unit 4 during night, that is, in order to prevent the above-described decompressed state to be released so that water overflows from the attached water tank 7, it is desirable that an opening and closing door (not shown) is provided at the communication opening 3 and can close the same.

With the invention constructed as described above, since operation of an air pump that is the decompression unit 4 enables air within the water tank body 1 to be drawn, the water tank body 1 is brought to a decompressed state. Within the water tank body 1 brought to the decompressed state, the water level is maintained raised to a constant or predetermined level. Thus, the water level within the attached water tank 7, which has its open upper end and which communicates with the water tank body 1 at the lower end thereof, is located at a position lower than the water level within the water tank body 1, during decompression thereof. At this time, the decompressed state within the water tank body 1 is suitably regulated or adjusted in order to prevent the water from overflowing from the attached water tank 7 whose upper end is open.

In this manner, fishes and so on, which sail within the water tank body 1, can get into the attached water tank 7 through the communication opening 3. Since the attached water tank 7 has its height of the order that a person can look into the attached water tank 7 when the person stands up, the person can enjoy the fishes and so on within the attached water tank 7 in such a manner that the person directly looks into the attached water tank 7 from the above. Further, it is made possible to take an action or behavior such as provisioning or feeding with respect to the fishes and so on within the attached water tank 7.

FIGS. 2 through 5 show other embodiments of the invention. In FIGS. 2 through 5, components and parts like or similar to those illustrated in FIG. 1 are designated by the same or like reference numerals, and the description of the like or similar components and parts will be omitted to avoid repetition.

In the embodiment illustrated in FIG. 2, a ladder 8 is mounted to the wall portion 6 of the attached water tank 7. By utilization of the ladder 8, a person can drive into the water tank body 1 from the attached water tank 7.

In the embodiment illustrated in FIG. 3, the attached water tank 7 is formed into a generally semi-dish-like configuration in cross-section, so that the attached water tank 7 is made small in size and is reduced in capacity. Thus, the attached water tank 7 is brought to one preferable for provisioning or feeding with respect to fishes and so on.

Figure 4:
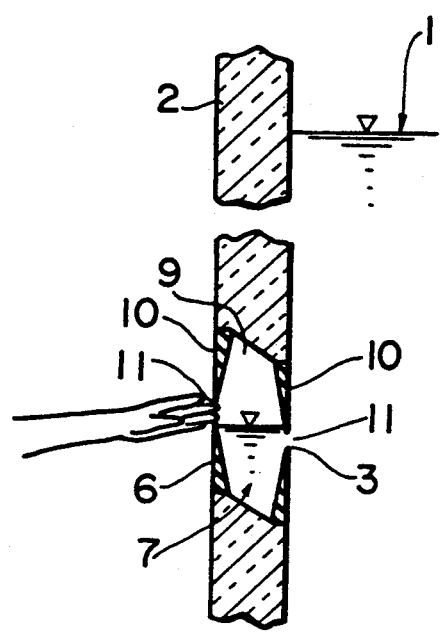
FIGS. 4 and 5 are cross-sectional views showing still another embodiment of the above water tank apparatus.

In the embodiment illustrated in FIG. 4, the attached water tank 7 is formed by a part of the peripheral wall 2 of the water tank body 1. That is, an inserting opening 9 is formed through the part of the peripheral wall 2. The inserting opening 9 has its inner and outer sides which are constituted respectively by a pair of partition walls 10 and 10 made of soft rubber or the like. A space of the inserting opening 9 partitioned by the pair of partition walls 10 and 10 is formed into the attached water tank 7. The pair of partition walls 10 and 10 are formed therein respectively with a pair of slits 11 and 11. Outward one of the pair of slits 11 is located at a position higher than the inward slit 11.

Figure 5:
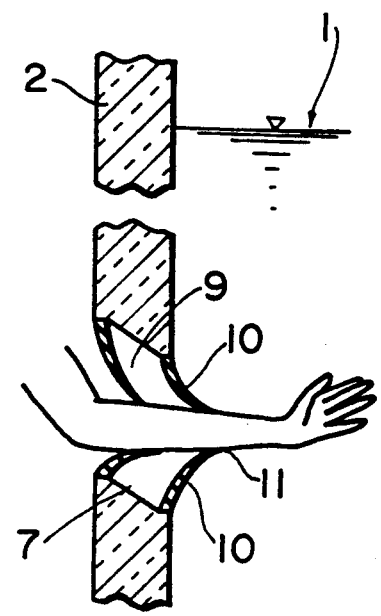

In the embodiment illustrated in FIG. 4, the water within the water tank body 1 enters, through the inward slit 11, into the inserting opening 9 that is the part of the attached water tank 7. As described above, however, the decompressing operation due to the decompression unit 4 prevents the water from overflowing from the outward slit 11 to the outside (refer to FIG. 4). Accordingly, as shown in FIG. 5, even if a hand is inserted into the inserting opening 9 from the outside, and is further inserted into a location within the water tank body 1, portions of the respective partition walls 10 and 10 adjacent the pair of slits 11 and 11 are in close contact with the periphery of the hand so that the water is prevented from leaking. Thus, it is possible to directly take an action, from the outside, such as provisioning or the like with respect to fishes and so on within the water tank body 1.

Figure 6:
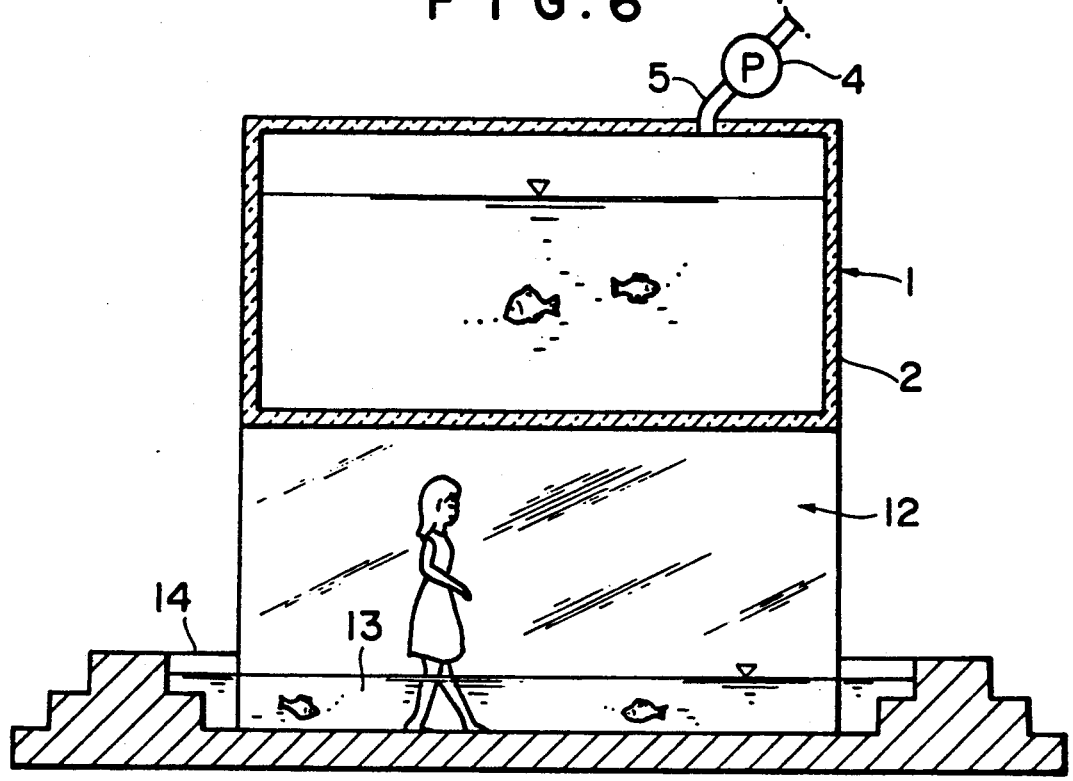
FIG. 6 is a cross-sectional view of a water tank apparatus according to the invention, which is provided therein with a tunnel.
Figure 7:
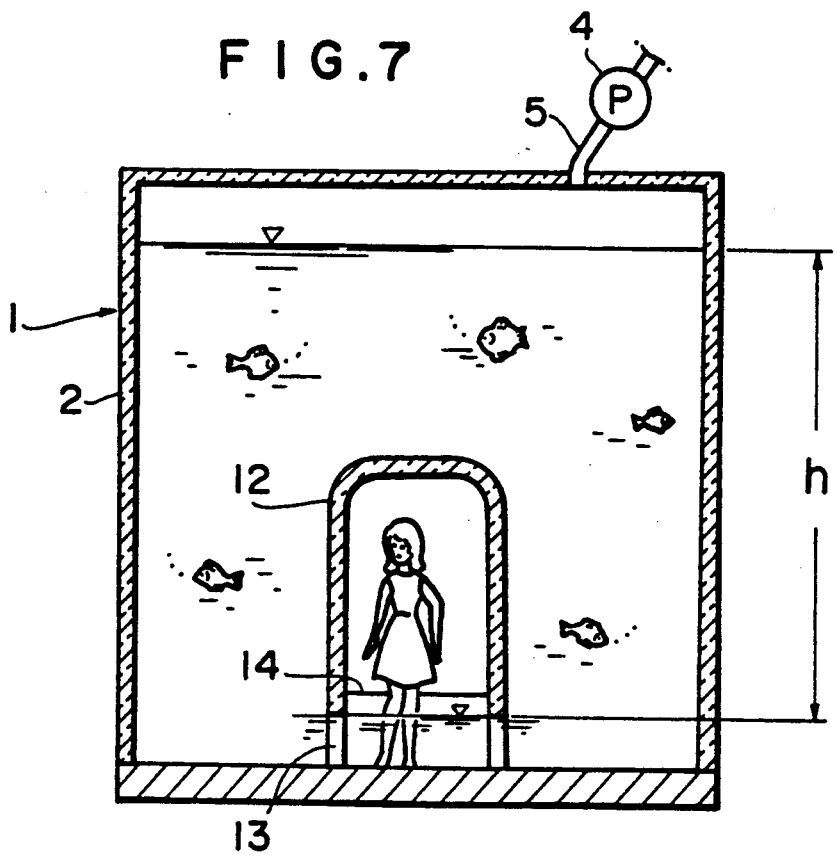
FIG. 7 is a cross-sectional view of the water tank apparatus illustrated in FIG. 6, as viewed from another side.
Figure 8:
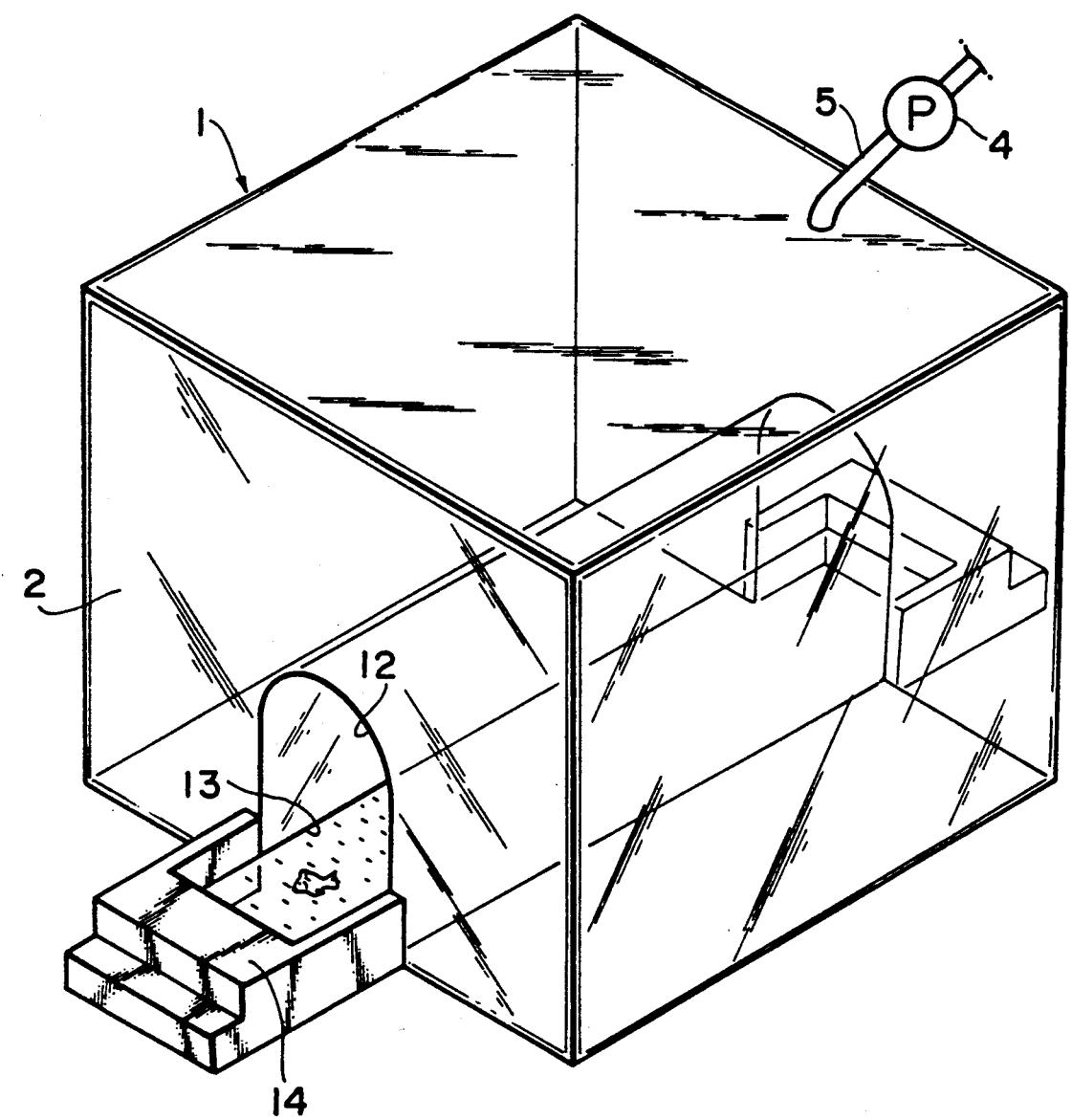
FIG. 8 is a perspective view of the water tank apparatus illustrated in FIGS. 6 and 7, with the details within the water tank apparatus omitted.

In the embodiment illustrated in FIG. 6, at least the peripheral wall 2 of the large water tank 1 for raising fishes and shellfishes or the like, aquatic life or the like is made of a transparent material such as a glass material, acrylic resin or the like in a gas-tight manner. The peripheral wall 2 has its rear surface whose upper portion is provided with the suction passage 5. The suction passage 5 is connected to the decompression unit 4 such as a vacuum pump or the like.

The water tank body 1 has its lower portion within which a tunnel 12 made of a transparent material is provided. The tunnel 12 has its both open ends and communicates with the outside. The tunnel 12 extends through the lower portion of the water tank body 1 in such a manner that the tunnel 12 is connected to the water tank body 1. The tunnel 12 has its wall whose lower end is formed therein with a communication opening 13 communicating with the water tank body 1.

The tunnel 12 has its both ends which are provided respectively with a pair of checking or damming-up walls 14 and 14 which are located outside of the water tank body 1, in order to prevent the water within the tunnel 12 from flowing to the outside. The pair of damming-up walls 14 and 14 have their respective upper ends which are located at their respective positions higher than the communication opening 13.

A decompression value within the water tank body 1 is of the order of (1−0.1h) atmospheric pressure, if a desired distance between the water level within the water tank body 1 and the water level within the tunnel 12 is h, and the atmospheric pressure is 1.

In connection with the above, it is unnecessary for the tunnel 12 to have its both ends which are open, but there is no hindrance if both ends of the tunnel 12 are closed. Further, for example, in order to secure safety at interruption of the decompression unit 4 during night, that is, in order to prevent the above-described decompressed state from being released so that water overflows from the damming-up walls 14 and 14 of the tunnel 12, it is desirable that an opening and closing door (not shown) is provided at the communication opening 13 and can close the same.

With the above-described arrangement of the invention, since air within the water tank body 1 is drawn by the operation of the air pump that is the decompression unit 4, the water tank body 1 is brought to a decompressed condition or state. Within the water tank body 1 brought to the decompressed state, the water level within the water tank body 1 is maintained raised to a constant or predetermined level. Thus, the water level within the tunnel 12, which communicates with the water tank body 1 at the lower end thereof, is located at a position lower than the water level within the water tank body 1, during decompression thereof, in spite of the fact that the tunnel 12 has its both open ends and communicates with the outside.

In this case, the decompressed state within the water tank body 1 is suitably adjusted in order to prevent the water from leaking from the tunnel 12 whose both ends are open.

With the construction described above, decompression within the water tank body 1 enables the water level within the tunnel 2 to be sufficiently reduced less than the water level within the water tank body 1 under the atmospheric pressure. Accordingly, in consideration of the height of the bottom face of the water tank body 1 and the height of the upper end of the communication opening 13, if the height of the upper end of the communication opening 13 is brought to one of the order of an ankle or of a location below a knee, an enjoyer can stride over the pair of damming-up walls 14 and 14 and get into the tunnel 12 under such a condition that, for example, the enjoyer takes off his shoes, or puts on his boots. Thus, the enjoyer can freely walk within the tunnel 12.

Further, since the fishes or the like sailing within the water tank body 1 can get into the tunnel 12 through the communication opening 13, the enjoyer can see through the tunnel 12 to enjoy the ecology of the fishes within the water tank body 1 just as the enjoyer is under water. Moreover, it is also made possible to take an action such as direct provisioning, at his foot, with respect to the fishes and so on which said within the tunnel 12.

What is claimed is:

1. A water tank apparatus comprising:
   a gas-tight water tank body made of a transparent material, for raising fishes and shellfishes or the like, aquatic life or the like;
   an attached water tank made of a transparent material and having an open upper end, said attached water tank being attached to a peripheral wall of a lower portion of said water tank body so that said attached water tank communicates with said water tank body; and
   a decompression unit provided at an upper end portion of said water tank body, for decompressing a space within the water tank body.

2. The water tank apparatus according to claim 1, further comprising a communication opening provided between said water tank body and said attached water tank, and on opening and closing door provided at said communication opening for preventing water from overflowing from said attached water tank.

3. The water tank apparatus according to claim 1 or, further comprising a ladder provided at a wall portion of said attached water tank.

4. The water tank apparatus according to claim 1, wherein said attached water tank is formed at a part of said peripheral wall of said water tank body, wherein said water tank apparatus further comprises a pair of partition walls provided respectively at both sides of said peripheral wall of said attached water tank, said pair of partition walls being made of an elastic material such as soft rubber or the like, wherein said pair of partition walls are formed therein respectively with a pair of slits, and wherein an outward one of said pair of slits is located at a position higher than the remaining inward slit.

5. The water tank apparatus according to claim 2, further comprising a ladder provided at a wall portion of said attached water tank.

6. A water tank apparatus comprising:
   a large and gas-tight water tank body made of a transparent material, for raising fishes and shellfishes or the like, aquatic animals or the like;
   a tunnel provided at and within a lower portion of said water tank body and made of a transparent material, said tunnel having its both open ends and communicating with the outside;
   a decompression unit provided at an upper end portion of said water tank body, for decompressing a space within the water tank body;
   a communication opening provided at a lower end of said tunnel and communicating with the space within said water tank body; and
   a pair of damming-up walls provided respectively at both ends of said tunnel for preventing water from overflowing from said tunnel.

7. The water tank apparatus according to claim 6, further comprising an opening and closing door provided at said communication opening between said water tank body and said tunnel for preventing water from overflowing from said damming-up walls.

* * * * *